Figure 1:
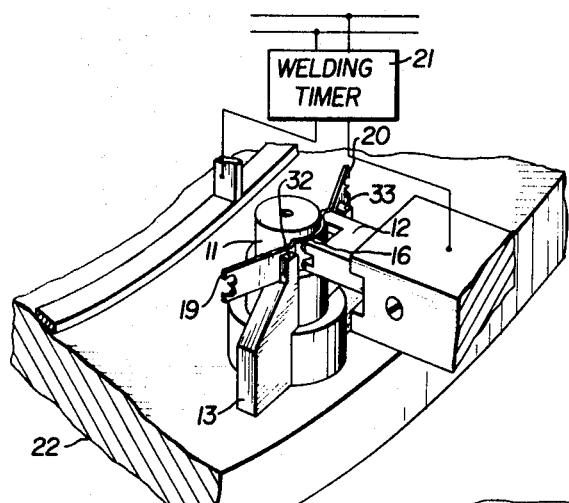

United States Patent [11] 3,604,886

[72] Inventor Chester O. Merchant
 Owensboro, Ky.
[21] Appl. No. 17,623
[22] Filed Mar. 9, 1970
[45] Patented Sept. 14, 1971
[73] Assignee Kentucky Electronics, Inc.
 Owensboro, Ky.

[54] WELDING JIGS FOR ALIGNING MOUNTING STRAPS ON CYLINDRICAL CRT ELECTRODES
 4 Claims, 4 Drawing Figs.
[52] U.S. Cl. ........................................... 219/80,
 219/158
[51] Int. Cl. ........................................... B23k 9/12,
 B21j 13/08
[50] Field of Search ........................................... 219/158,
 159, 93, 86, 78, 107, 80

[56] References Cited
 UNITED STATES PATENTS
 3,054,887  9/1962  Brooks ........................... 219/159 X
 3,417,220  12/1968  Merchant ....................... 219/158 X
 3,433,920  3/1969  Hedquist ........................ 219/107 X

*Primary Examiner*—J. V. Truhe
*Assistant Examiner*—Hugh D. Jaeger
*Attorney*—Laurence R. Brown ABSTRACT: A jig is arranged with a cylindrical metallic post for receiving a cylindrical CRT electrode snugly thereover arranged adjacent a pair of separated shaped insulating mounts with protruding fingers above a rest platform for engaging the ends of and confining a mounting strap with a cylindrical section conforming to the outer surface of the cup electrode, so that the strap is held in place adjacent the cylindrical electrode in a loosely fitting arrangement into which a welding head may be moved into the cylindrical section between said fingers to push the strap closely adjacent the cylinder and weld it thereto.

3,604,886

PATENTED SEP 14 1971

INVENTOR
CHESTER O. MERCHANT

BY Lawrence R. Brown
ATTORNEY

WELDING JIGS FOR ALIGNING MOUNTING STRAPS ON CYLINDRICAL CRT ELECTRODES

This invention relates to manufacture of electrodes for cathode-ray tubes by welding together two parts comprising a cylindrical electrode and a strap having a cylindrical section and two extending mounting bracket arms, and more particularly, it relates to jig assemblies for holding said cup said strap in relative positions for welding.

In the construction of cathode-ray picture tubes and, particularly, three-gun color tubes, it has been customary to mount cylindrical electrodes between two separated glass beads into which the ends of mounting brackets extending from the cylinder are impaled when the surface of the beads is softened by heating. One such mounting bracket has mounting arms extending from each end of a section having a cylindrical surface which conforms to the outer surface of a cylindrical electrode in the electron gun of the cathode-ray tube.

In an electron gun, alignment and spacing of the electrodes is critical and the electron gun performance is, thus, dependent upon close tolerance controls in fitting the electrode and bracket together in precise positions without skew or axial misalignment which might occur between the two electrodes when placed or clamped in a jig during the welding operation.

Furthermore, it is necessary in either automatic machines or hand-loaded machines to provide a jig assembly which can be readily loaded without problems of alignment, seating or misregistration. If a strap and cylinder are tightly clamped together by a movable clamp, for example, it may require a very careful placement of the parts in registration before clamping and, thus, may become an expensive operation in terms of assembly time.

Therefore, it is an object of the invention to provide improved and simplified jig means for simply and effectively processing and welding electron gun cylinder electrode-strap assemblies.

Accordingly, there is provided by this invention a jig assembly comprising a metallic post which serves as one welding electrode and which holds a cylindrical electrode snugly thereover in position to receive a strap welded thereon in conformity with the outer cylinder surface. Adjacent and straddling the metallic post are two insulating posts with fingers extending from rest platforms thereon on opposite sides of the cylinder to confine a mounting strap loosely adjacent the cylindrical electrode. Between said insulating posts is an access window for receiving welding electrode means which carries the loosely positioned strap along the platforms which determine the axial alignment position of the strap on the cylinder and clamps it tightly into conformity with the cylindrical surface of the electrode before welding current is applied.

Figure 2:
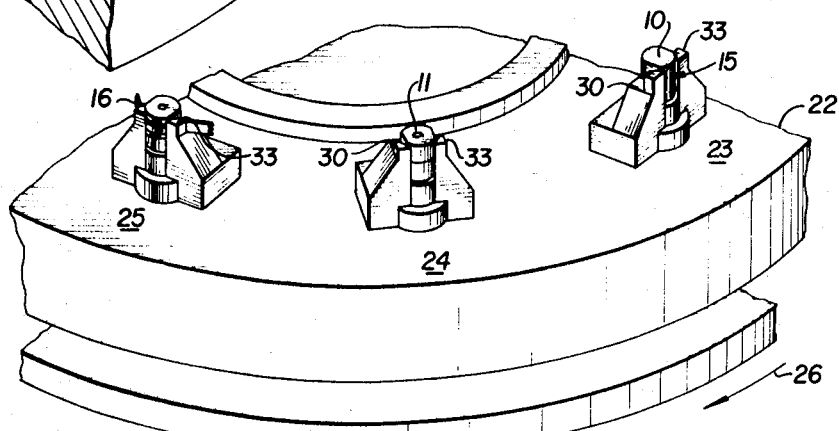
Figure 3:
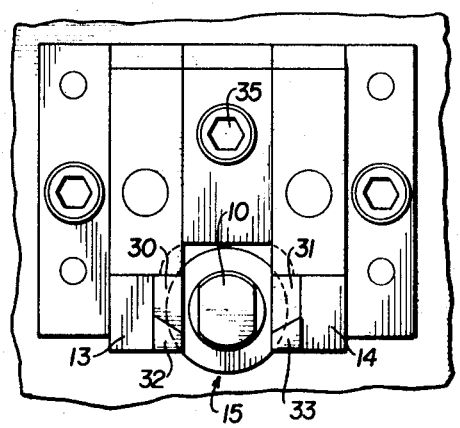
Figure 4:
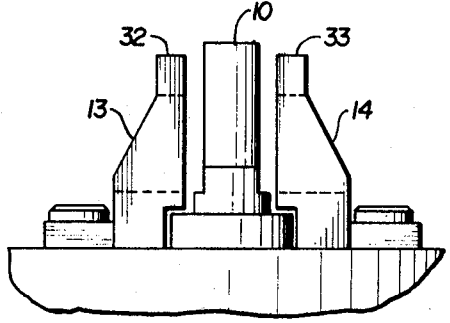

Further features, objectives and advantages of the invention will be found throughout the following detailed description of said invention, with a preferred embodiment illustrated in the accompanying drawing, wherein:

FIG. 1 is a perspective view, partly broken away, of an arrangement for welding straps on cylindrical CRT electrodes, FIG. 2 is a perspective view, partly broken away, of an indexing table for receiving electrodes in welding position, FIG. 3 is a top view of a jig assembly for holding straps against cylindrical electrodes;, FIG. 4 is an elevation view of the jig assembly of FIG. 3.

Referring now to the drawing, a jig assembly is provided with a metallic center post 10 over which a cylindrical CRT electrode such as a cup 11 is snugly placed in a fixed axial position. The post 10 serves as one welding electrode, and a further electrode 12 may be inserted in a window 15 between two insulating posts 13, 14 to clamp a mounting strap 16 against the cylindrical outer surface of the CRT electrode 11 for welding thereto. The strap 16 has a cylindrical surface section which conforms to the electrode 11 and two extending arms 19, 20 are formed for impaling within two spaced glass beads to hold the electrode in a critically spaced position in an electron gun in a conventional manner.

Welding timer means 21 is provided to spotweld the strap 16 against the cylindrical electrode 11 after the two pieces are moved into firm registered contact by means of a movable assembly (not shown) which moves welding head 12 in and out of window 15.

The indexing turnable 22 provides a plurality of stations at which the parts may be loaded and welded. Thus, as shown in FIG. 2, station 23 has an empty post 10 upon which is loaded a grid cup 11 at station 24 and the strap 16 is loaded at station 25. The turntable indexes step by step in a conventional manner, as shown by the arrow 26, so that an operator may sit at one position.

In order to critically register the strap 16 adjacent the electrode 11 for welding, it has been found that movable clamps and the like may require tedious and careful loading to prevent skewed straps or axially misaligned straps. Thus, the illustrated jig is provided by this invention to produce simplified construction and better alignment of parts without criticality of loading.

Thus, the insulating posts 13 and 14 disposed on opposite sides of the metallic post 10 may be formed of Bakelite or other suitable insulator materials to have a rest platform section 30, 31 upon which a strap may freely rest by gravity to produce axial alignment along the axis of cylindrical electrode 11. The insulating mounts are shaped to provide protruding fingers 32, 33 which rest against the arms 19 and 20 of strap 16 as shown in FIG. 1 when the strap 16 is loaded in position. Enough tolerance or spacing is provided, so that the strap is loosely held adjacent the electrode. This prevents misalignment, since the strap 16 may then conform with the outer surface of the electrode 11, when welding head 12 is firmly pressed thereagainst, using the natural curved surfaces to effect alignment as the strap arms 19 and 20 ride on platforms 30, 31. Thus, an effective simple structure provides excellent alignment.

As seen in FIGS. 3 and 4, the posts 10, 13 and 14 may be adjusted relative to each other by means of clamping bolt 35, for example, to adjust the amount of spacing desired. Certain variations can be made for strap or electrodes of slightly different shapes by conforming the shape of fingers 32, 33, etc.

What is claimed is:

1. An arrangement for affixing to a cylindrical cathode-ray tube electrode a flat ribbon strap shaped cylindrically at one section to conform to a portion of the outer circumference of the cylindrical electrode with bracket ends extending from the section away from the cylinder and adapted to be embedded into two separate spaced glass beads comprising in combination, a metallic post serving as one electrode of welding means shaped to receive a cylindrical electrode snugly thereover in a fixed axial position, an insulated platform assembly having two rest platform members disposed on opposite sides of said post to receive the edges of said brackets to rest thereon loosely by force of gravity, a nonmovable assembly of shaped finger members extending above the platform assembly on each side of said cylinder with an access window therebetween for receiving welding electrode means, said finger means positioned confining the bracket ends of a strap in the rest position to hold the strap cylindrical section loosely adjacent the out surface of the cylindrical electrode, and means including movable welding electrode means to position welding electrodes through said window against said strap as the sole means to hold it tightly against said cylindrical electrode in welding position.

2. An arrangement as defined in claim 1 wherein the platform assembly comprises two insulating members separately mounted on opposite sides of said metallic posts, adjustable mounting structure on each insulating member relatively positioning each of the insulating members at a selectable position alongside said metallic post, and means fixing the insulating members firmly in the selected adjustable position.

3. An arrangement for receiving and holding electrode straps as defined in claim 1 including a step-by-step indexing table with the arrangement located at a plurality of separate successive indexed stations adapted respectively for receiving said cylindrical electrode on said metallic post, receiving said strap in a position confined by said fingers adjacent the cylindrical electrode on said metallic post, receiving said movable welding electrode means through said window to hold said strap tightly in said welding position and means energizing the welding electrode to weld the strap to the cathode-ray tube electrode when the strap is tightly held thereby against the cathode-ray tube electrode.

4. An arrangement as defined in claim 1 wherein the welding electrode means comprises a head with a set of projections contacting said strap at several spaced positions.